United States Patent
You et al.

(10) Patent No.: US 9,522,675 B1
(45) Date of Patent: Dec. 20, 2016

(54) PARKING CONTROL SYSTEM AND CONTROL METHOD THEREOF

(71) Applicant: MANDO CORPORATION, Pyeongtaek-si (KR)

(72) Inventors: Kwan Sun You, Yongin-si (KR); Tae Bong Noh, Yongin-si (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 14/807,870

(22) Filed: Jul. 23, 2015

(30) Foreign Application Priority Data

Jul. 14, 2015 (KR) .................. 10-2015-0099664

(51) Int. Cl.
- *B60W 30/06* (2006.01)
- *G01C 21/34* (2006.01)
- *G06F 3/041* (2006.01)
- *G06F 3/048* (2013.01)

(52) U.S. Cl.
CPC .............. *B60W 30/06* (2013.01); *G01C 21/34* (2013.01); *G06F 3/048* (2013.01); *G06F 3/0412* (2013.01)

(58) Field of Classification Search
CPC ...... B60W 30/06; G01C 21/34; G06F 3/0412; G06F 3/048
USPC ......................................................... 701/25
See application file for complete search history.

(56) References Cited

U.S. PATENT DOCUMENTS

| 8,140,209 B2 * | 3/2012 | Adachi | B62D 15/027 |
| | | | 701/23 |
| 8,599,043 B2 * | 12/2013 | Kadowaki | B62D 15/027 |
| | | | 180/199 |
| 8,890,716 B2 * | 11/2014 | Takano | B62D 15/0265 |
| | | | 340/435 |
| 9,216,765 B2 * | 12/2015 | Inagaki | B62D 15/0285 |
| 2006/0136109 A1 * | 6/2006 | Tanaka | B60W 40/04 |
| | | | 701/41 |

(Continued)

FOREIGN PATENT DOCUMENTS

| DE | 10 2011 122 616 | 6/2013 |
| DE | 10 2013 221 201 | 5/2015 |

OTHER PUBLICATIONS

Office Action dated Apr. 19, 2016 for German Patent Application No. 10 2015 009 778.4.

*Primary Examiner* — Atul Trivedi
(74) *Attorney, Agent, or Firm* — Ladas & Parry, LLP

(57) ABSTRACT

The present invention provides a parking control system including: a parking mode selection unit that supports a first-stage selection and a second-stage selection, wherein a parallel parking mode or a perpendicular parking mode is selected in the first-stage selection, and a head-in parking mode or a reverse parking mode is selected in the second-stage selection in cases where the perpendicular parking mode is selected in the first-stage selection; a sensor unit comprising a plurality of sensors mounted on one or more of the front, rear, and sides of a vehicle; a parking space search unit that searches for a parking space based on a value detected by the sensor unit; a path setting unit that sets a parking path along which the vehicle is parked in the parking space, which is discovered by the parking space search unit, according to the parking mode selected by the parking mode selection unit; and a parking controller that controls the vehicle to move along the parking path set by the path setting unit.

17 Claims, 12 Drawing Sheets

(56) References Cited

U.S. PATENT DOCUMENTS

| | | | |
|---|---|---|---|
| 2009/0091475 A1* | 4/2009 | Watanabe | B60Q 9/005 340/932.2 |
| 2010/0118140 A1* | 5/2010 | Iwakiri | B60R 1/00 348/135 |
| 2010/0219010 A1* | 9/2010 | Kadowaki | B62D 15/0285 180/204 |
| 2010/0259420 A1* | 10/2010 | Von Reyher | B62D 15/028 340/932.2 |
| 2011/0025848 A1* | 2/2011 | Yumiba | B60R 1/00 348/148 |
| 2011/0273310 A1* | 11/2011 | Kadowaki | B62D 15/0285 340/932.2 |
| 2013/0144492 A1* | 6/2013 | Takano | B62D 15/0285 701/42 |
| 2013/0151060 A1* | 6/2013 | Lee | B62D 15/0285 701/25 |
| 2014/0055615 A1* | 2/2014 | Chen | B62D 15/028 348/148 |
| 2014/0244095 A1* | 8/2014 | Choi | B62D 15/029 701/25 |
| 2014/0333455 A1* | 11/2014 | Lee | B62D 15/028 340/932.2 |
| 2015/0073642 A1* | 3/2015 | Widmer | G01C 21/36 701/22 |
| 2015/0073661 A1* | 3/2015 | Raisch | B62D 15/027 701/41 |
| 2015/0100177 A1* | 4/2015 | Inagaki | B60W 30/06 701/1 |
| 2015/0175205 A1* | 6/2015 | Park | B62D 15/0285 701/41 |
| 2016/0075326 A1* | 3/2016 | Kiyokawa | B60W 30/06 701/41 |
| 2016/0075329 A1* | 3/2016 | Tomozawa | B62D 15/0285 701/41 |

* cited by examiner

PARKING CONTROL SYSTEM AND CONTROL METHOD THEREOF

CROSS-REFERENCE TO RELATED APPLICATION

This application claims priority from and the benefit under 35 U.S.C. §119(a) of Korean Patent Application No. 10-2015-0099664, filed on Jul. 14, 2015, which is hereby incorporated by reference for all purposes as if fully set forth herein.

BACKGROUND OF THE INVENTION

1. Field of the Invention

The present invention relates to a parking control system and a control method thereof and, more specifically, to a parking control system and a control method thereof that can decrease the number of times that a driver presses a button in order to select a desired parking mode and can prevent an excessive increase in the number of button presses even when the driver misses the desired parking mode by mistake.

2. Description of the Prior Art

As vehicles are used as necessities for people these days, the number of vehicles significantly increases, which results in serious problems with parking. Parking spaces may be reduced with the increase of vehicles in limited areas, cities, and countries, and in order to solve the deficiency in the parking spaces, the parking section for a single vehicle becomes narrower. Further, in cases where many vehicles are parked together in a parking space that does not contain any markings for parking sections, space between vehicles may be narrow. In this case, it is difficult for a driver to park his/her vehicle in the narrow parking space or to take the vehicle out of the narrow parking space by driving the vehicle himself/herself while identifying obstacles around the vehicle with his/her naked eyes. Accordingly, parking control systems have been recently developed and embedded in vehicles to assist with parking by automatically steering the vehicles while the vehicles are parked in parking spaces.

Parking control systems provide various parking modes according to the arrangement and position of a parking space, a parking direction, and the like. The parking control systems basically provide a perpendicular parking mode or a parallel parking mode according to whether a vehicle is to be parked in a perpendicular or parallel parking space. In addition, the parking control systems provide a right parking mode or a left parking mode according to whether the parking space is on the right or left side of the vehicle. Further, in the perpendicular parking mode, the parking control systems provide a reverse parking mode or a head-in parking mode according to whether the vehicle is to be parked in a reverse parking space or a head-in parking space.

The plurality of parking modes may be sequentially selected by a driver's manipulation of a button for selecting the parking mode. However, in the parking mode selection process, the driver may miss a desired parking mode if the driver makes a mistake when pressing the button for selecting the parking mode. In this case, the driver has to press the button for selecting the parking mode all over again in sequence in order to select the desired parking mode. Further, the button for selecting the parking mode is likely to break down due to the excessive use thereof.

SUMMARY OF THE INVENTION

An aspect of the present invention is to provide a parking control system and a control method thereof that can decrease the number of times that a driver presses a button in order to select a desired parking mode and can prevent an excessive increase in the number of button presses even when the driver misses the desired parking mode by mistake.

In accordance with one aspect of the present invention, a parking control system includes: a parking mode selection unit that supports a first-stage selection and a second-stage selection, wherein a parallel parking mode or a perpendicular parking mode is selected in the first-stage selection, and a head-in parking mode or a reverse parking mode is selected in the second-stage selection in cases where the perpendicular parking mode is selected in the first-stage selection; a sensor unit containing a plurality of sensors mounted on one or more of the front, rear, and sides of a vehicle; a parking space search unit that searches for a parking space based on a value detected by the sensor unit; a path setting unit that sets a parking path along which the vehicle is parked in the parking space, which is discovered by the parking space search unit, according to the parking mode selected by the parking mode selection unit; and a parking controller that controls the vehicle to move along the parking path set by the path setting unit.

In accordance with another aspect of the present invention, a parking control method includes: a first-stage parking mode selection step for selecting either a parallel parking mode or a perpendicular parking mode; a second-stage parking mode selection step for selecting either a head-in parking mode or a reverse parking mode in cases where the perpendicular parking mode is selected in the first-stage parking mode selection step; a parking space search step for searching a parking space; a path creation step for creating a parking path for the discovered parking space according to the head-in parking mode or the reverse parking mode which is selected in the second-stage parking mode selection step; and a parking control step for controlling the parking of a vehicle according to the parking path created in the path creation step.

According to the present invention, the selection of a parking mode is performed in two stages, and one of four modes is selected in the first stage, which makes it possible to significantly decrease the number of times that a driver has to press a parking mode selection unit again when the driver misses a desired parking mode, compared to the related art. In addition, the number of times that the driver presses the parking mode selection unit in the process of selecting a parallel parking mode is reduced by a half, compared to the related art, so that the driver can more rapidly select the parallel parking mode in an easy and simple manner. Furthermore, as the number of times that the driver has to press the parking mode selection unit decreases in this way, the possibility of a breakdown of buttons constituting the parking mode selection unit can be reduced.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
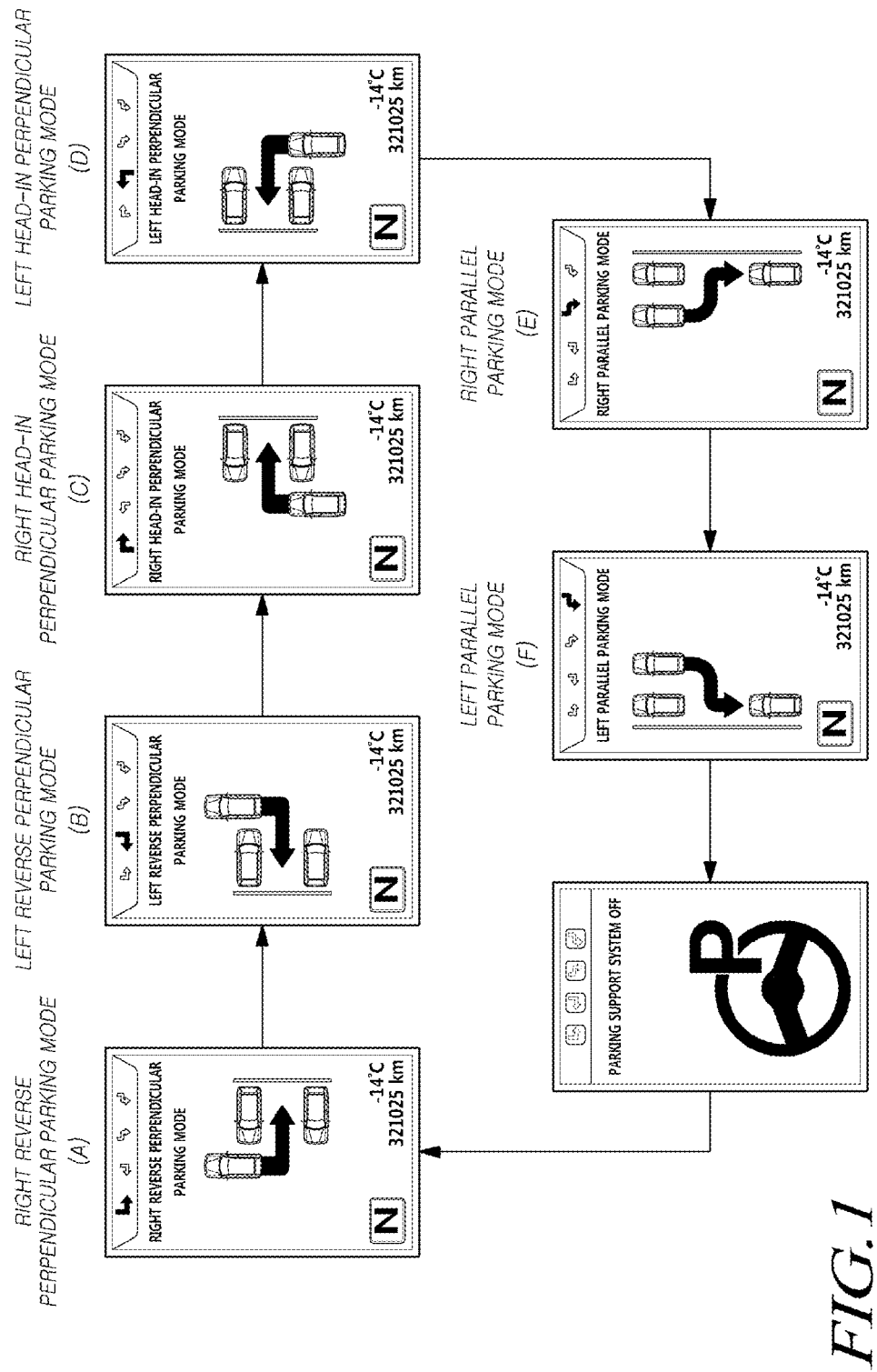
FIG. 1 illustrates screens representing selectable parking modes in a parking control system according to the related art.

Hereinafter, embodiments of the present invention will be described in detail with reference to the accompanying drawings. In the following description, the same components will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 illustrates screens representing selectable parking modes in a parking control system according to the related art.

As illustrated in FIG. 1 (a) to (f), the parking control system may provide six parking modes, including a right reverse perpendicular parking mode (a), a left reverse perpendicular parking mode (b), a right head-in perpendicular parking mode (c), a left head-in perpendicular parking mode (d), a right parallel parking mode (e), and a left parallel parking mode (f).

In order to use such a parking control system, a driver has to select one of six parking modes using a button for selecting a parking mode. Every time the driver presses the button for selecting a parking mode, the right reverse perpendicular parking mode (a), the left reverse perpendicular parking mode (b), the right head-in perpendicular parking mode (c), the left head-in perpendicular parking mode (d), the right parallel parking mode (e), and the left parallel parking mode (f) are sequentially selected.

Accordingly, the driver has to press the button for selecting a parking mode five times in order to select the right parallel parking mode (e) and six times in order to select the left parallel parking mode (f). That is, the driver cumbersomely has to press the button for selecting a parking mode several times in order to select a parking mode. Further, if the driver misses a desired parking mode by mistake while pressing the button for selecting a parking mode, the driver has to press the button for selecting a parking mode about six more times again to select the desired parking mode. Therefore, the driver cumbersomely has to press the button for selecting a parking mode an excessive number of times in order to select a parking mode. In addition, if the button for selecting a parking mode is frequently used, the button is more likely to break down.

Figure 2:
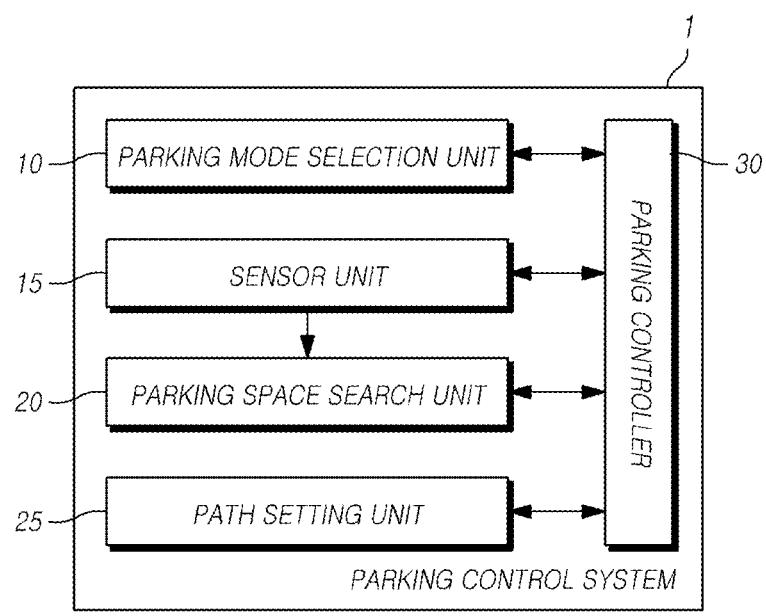
FIG. 2 is a block diagram of a parking control system according to an embodiment of the present invention.

FIG. 2 is a block diagram of a parking control system according to an embodiment of the present invention.

Referring to FIG. 2, the parking control system 1 may support an automatic parking control according to both a perpendicular parking mode and a parallel parking mode, and may allow a driver to select a parking mode in two stages, thereby simplifying the selection process for the parking mode.

The parking control system 1, as illustrated in FIG. 2, may include a parking mode selection unit 10 for selecting a parking mode in two stages, a sensor unit 15 that includes sensors mounted on the front, rear, and sides of a vehicle, a parking space search unit 20 for searching for a parking space according to the detection result of the sensor unit, a path setting unit 25 that sets a parking path for parking the vehicle in the discovered parking space, and a parking controller 30 for controlling the vehicle to move along the parking path.

The parking mode selection unit 10 may be used by the driver to select one of a plurality of parking modes in two stages, and may be constituted with one or more selection buttons. Parking modes that may be selected by the selection buttons are broadly categorized into a perpendicular parking mode and a parallel parking mode, and descriptions thereof will be given below as follows.

The perpendicular parking mode may be divided into a right perpendicular parking mode and a left perpendicular parking mode according to whether the vehicle is to be parked in a right or left parking space. The right perpendicular parking mode may be divided into a right head-in perpendicular parking mode and a right reverse perpendicular parking mode, and the left perpendicular parking mode may be divided into a left head-in perpendicular parking mode and a left reverse perpendicular parking mode according to whether the vehicle is to be parked in the front or rear direction.

Accordingly, the perpendicular parking mode may include a total of four parking modes, namely, the right head-in perpendicular parking mode, the left head-in perpendicular parking mode, the right reverse perpendicular parking mode, and the left reverse perpendicular parking mode.

The parallel parking mode may be divided into a right parallel parking mode and a left parallel parking mode according to whether the vehicle is to be parked in a right or left parking space. Since the vehicle is parked in the same direction as the progress direction thereof in the parallel parking mode, it is unnecessary to consider whether the vehicle is to be parked in the front or rear direction.

Accordingly, the parking modes are broadly categorized into a perpendicular parking mode and a parallel parking mode; the perpendicular parking mode is subdivided according to whether the vehicle is to be parked in the left or right parking space and whether the vehicle is to be parked in the front or rear direction, and the parallel parking mode is subdivided according to whether the vehicle is to be parked in the left or right parking space. As a result, all the parking modes include a total of six parking modes, i.e., the right head-in perpendicular parking mode, the left head-in perpendicular parking mode, the right reverse perpendicular parking mode, the left reverse perpendicular parking mode, the right parallel parking mode, and the left parallel parking mode.

Each of the six parking modes may be selected by the parking mode selection unit 10 in two stages. In the first stage, perpendicular or parallel parking, which is a parking method, and left or right parking, which is associated with a parking position, are selected, and in the second stage, head-in or reverse parking is selected in cases where the perpendicular parking has been selected in the first stage.

Figure 3:
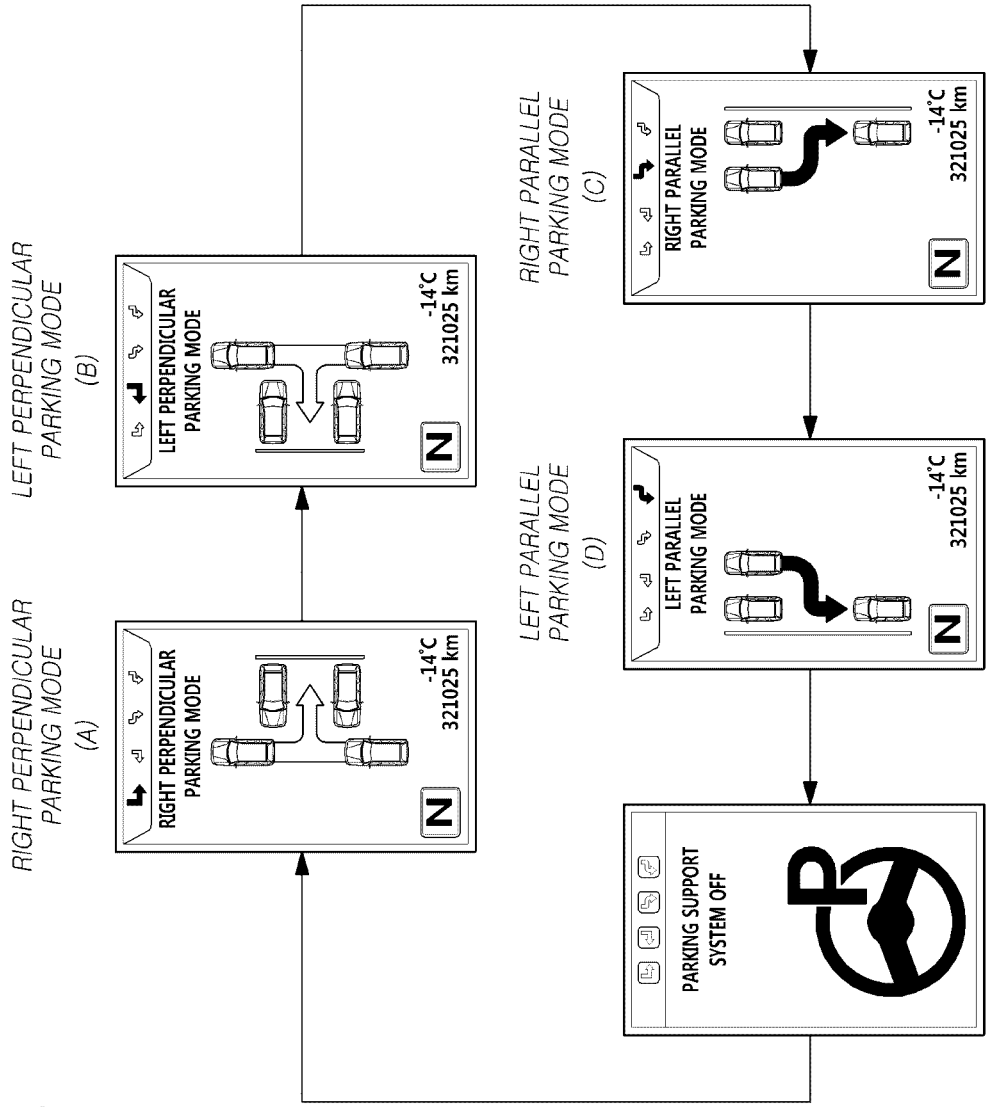
FIG. 3 illustrates screens representing parking modes that may be selected in the first stage in the parking control system according to the embodiment of the present invention.

Accordingly, a parking mode that may be selected in the first stage includes a right perpendicular parking mode, a left perpendicular parking mode, a right parallel parking mode, and a left parallel parking mode as illustrated in FIG. 3. Here, since the parallel parking mode includes only the right and left parallel parking modes, a selection is completed in the first stage in cases where the parallel parking mode is selected.

Figure 4:
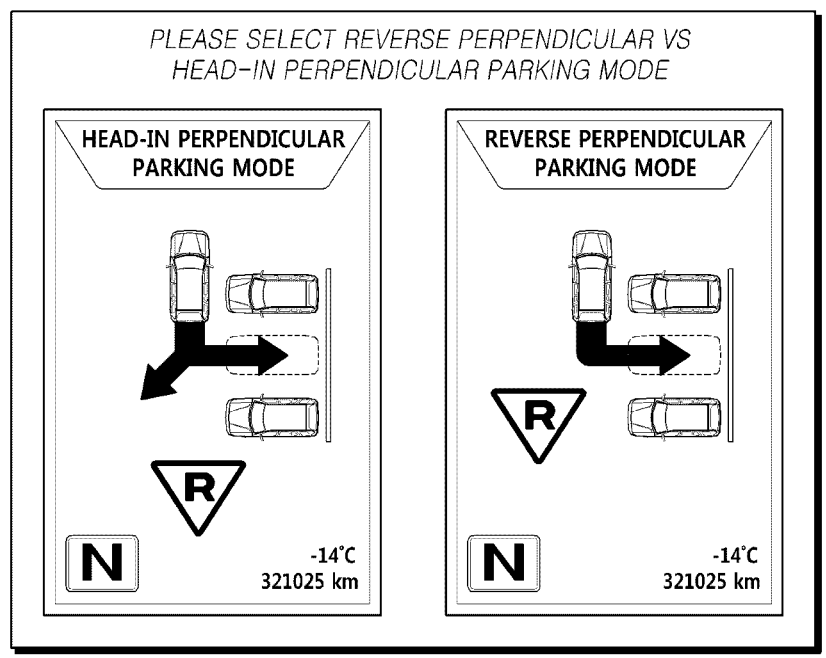
FIG. 4 illustrates screens representing parking modes that may be selected in the second stage in the parking control system according to the embodiment of the present invention.

In contrast, in cases where the perpendicular parking mode is selected, head-in or reverse parking has to be selected one more time in the second stage. According to the selection of the parking mode selection unit 10, a screen is displayed on a human machine interface (HMI) or a display panel as illustrated in FIG. 4 in order to guide the driver to select either the head-in parking mode or the reverse parking mode.

In cases where the right perpendicular parking mode is selected in the first stage and the head-in parking mode is selected in the second stage, the same control is made as when the right head-in perpendicular parking mode is selected from six modes described above is made.

In the same way, in cases where the right perpendicular parking mode is selected in the first stage and the reverse parking mode is selected in the second stage, the same control is made as when the right reverse perpendicular parking mode is selected.

Furthermore, in cases where the left perpendicular parking mode is selected in the first stage and the head-in parking mode is selected in the second stage, the same control is made as when the left head-in perpendicular parking mode is selected.

Last, in cases where the left perpendicular parking mode is selected in the first stage and the reverse parking mode is selected in the second stage, the same control is made as when the left reverse perpendicular parking mode is selected.

The parking mode selection unit 10 may be constituted with a system on/off button (not illustrated) for turning on/off the automatic parking control system 1 and a parking mode selection button (not illustrated) for selecting a parking mode. When the driver turns on the parking control system 1 by pressing the system on/off button, the driver may select one of a plurality of parking modes by using the parking mode selection button.

Every time the parking mode selection button is pressed, the parking modes which may be selected in the first stage may be sequentially displayed on the display panel or the HMI. Accordingly, when the parking mode selection button is pressed, the right perpendicular parking mode, the left perpendicular parking mode, the right parallel parking mode, and the left parallel parking mode are sequentially displayed. At this time, if the system on/off button is pressed, the right perpendicular parking mode, which is the first parking mode, may be displayed as a basic mode on the display panel or the HMI.

When the driver presses the parking mode selection button long or waits for a specified time while a desired parking mode is displayed, the corresponding parking mode may be selected.

For example, if the parking mode selection button is pressed once, the left perpendicular parking mode is displayed, and if the driver presses the parking mode selection button long or waits for about two to three seconds in this state, the left perpendicular parking mode is selected.

Meanwhile, in cases where the right or left parallel parking mode is selected in the first stage, parking control may be initiated after a parking space is discovered by the parking space search unit 20.

In contrast, in cases where the right or left perpendicular parking mode is selected in the first stage, parking control may be initiated after a parking space is discovered by the parking space search unit 20 and either head-in parking or reverse parking is selected in the second stage.

When a parking space is completely discovered, a screen is displayed on the display panel or the HMI in order to guide the driver to select either the head-in parking mode or the reverse parking mode, and the driver may press the parking mode selection button to select a desired parking mode from the head-in parking mode and the reverse parking mode.

If a plurality of parking mode selection buttons are provided, one button may be used to rotationally display the parking modes, and another button may be used to select a displayed parking mode.

For example, every time one button is pressed, the right perpendicular parking mode, the left perpendicular parking mode, the right parallel parking mode, and the left parallel parking mode may be sequentially displayed, and if the another button is pressed while the left parallel parking mode is displayed, the left parallel parking mode may be selected.

In cases where a parking mode is selected in two stages as described above, the driver selects one of four modes in the first stage for the selection of the parking mode. Accordingly, in cases where the drivers misses a desired parking mode by mistake, the driver may select the desired parking mode by pressing the parking mode selection unit 10 four more times. Therefore, the number of times that the driver has to press the parking mode selection unit 10 when selecting a parking mode decreases, compared to the related art, thereby relieving the driver's burden.

Furthermore, in the case of the parallel parking mode, the right parallel parking mode is disposed in the third place and the left parallel parking mode is disposed in the fourth place in the first stage, and the selection of a parking mode is accordingly completed only by pressing the parking mode selection unit 10 three or four times in the first stage. Therefore, the number of times that the driver presses the parking mode selection unit 10 in the process of selecting the parallel parking mode is reduced by 2, namely, by a half, compared to the related art, so that the driver can more rapidly select the parallel parking mode in an easy and convenient manner.

The sensor unit 15 may include a front sensor, a rear sensor, and side sensors that are mounted on the front, rear, and left and right sides of the vehicle, respectively, and each sensor may be an optical sensor using infrared rays, an ultrasonic sensor for oscillating and detecting ultrasonic waves, or a laser sensor using laser.

While the vehicle travels, each sensor of the sensor unit 15 may be used for maintaining an inter-vehicle distance, maintaining and detecting a traffic lane, detecting another vehicle on an adjoining traffic lane, and the like, and while the vehicle is parked, the sensor may be used for detecting the width of a parking space during the discovery of the parking space, or identifying whether an obstacle is in front of or behind the vehicle.

Figure 5:
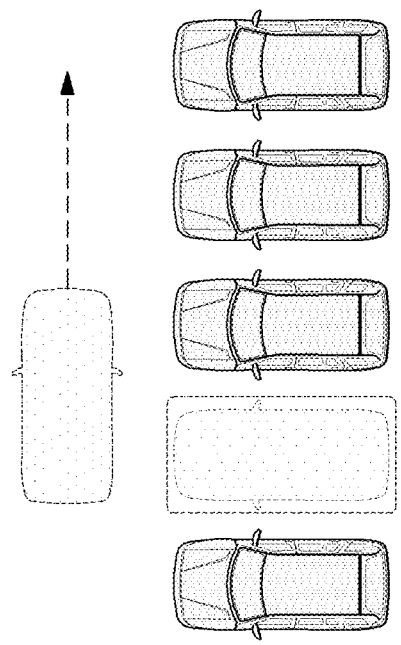
FIG. 5 is an exemplary diagram illustrating a process of searching for a parking space by a parking space search unit of FIG. 2.

The parking space search unit 20 identifies a parking space using values detected by the sensor unit 15 and determines whether parking is possible when the driver selects the first stage parking mode using the parking mode selection unit 10. At this time, the vehicle is autonomously driven by the parking controller 30, and the parking space search unit 20 identifies the parking space using a value detected by the side sensor as illustrated in FIG. 5.

In cases where a right perpendicular parking mode or a right parallel parking mode is selected in the selection of the first stage parking mode, the parking space search unit 20 identifies a parking space using a value detected by the side sensor mounted on the right side of the vehicle, and in cases where a left perpendicular parking mode or a left parallel parking mode is selected in the selection of the first stage parking mode, the parking space search unit 20 identifies a parking space using a value detected by the side sensor mounted on the left side of the vehicle.

At this time, the parking space search unit 20 may identify the width and depth of the parking space through the operation of the values detected by the side sensors and may determine whether perpendicular and/or parallel parking is possible, based on the magnitude of the identified parking space.

That is, in cases where perpendicular parking is selected by the parking mode selection unit 10, for example, where a right perpendicular parking mode or a left perpendicular parking mode is selected, the parking space search unit 20 determines whether the perpendicular parking is possible. In contrast, in cases where a right parallel parking mode or a left parallel parking mode is selected by the parking mode selection unit 10, the parking space search unit 20 determines whether the parallel parking is possible.

The determination result on whether the parking is possible, made by the parking space search unit 20, may be displayed through the HMI or the display panel, or may be informed through a speaker.

The path setting unit 25 may set a parking path according to a preset parking control program when the selection of a parking mode and the discovery of a parking space are completed. In cases where a right parallel parking mode or a left parallel parking mode is selected in the selection of the first stage parking mode, the path setting unit 25 sets a parking path shortly after a parking space is completely discovered.

In contrast, in cases where a right perpendicular parking mode or a left perpendicular parking mode is selected in the selection of the first stage parking mode, the path setting unit 25 sets a parking path when a head-in parking mode or a reverse parking mode is selected in the selection of the second stage parking mode after a parking space is completely discovered.

Figure 6:
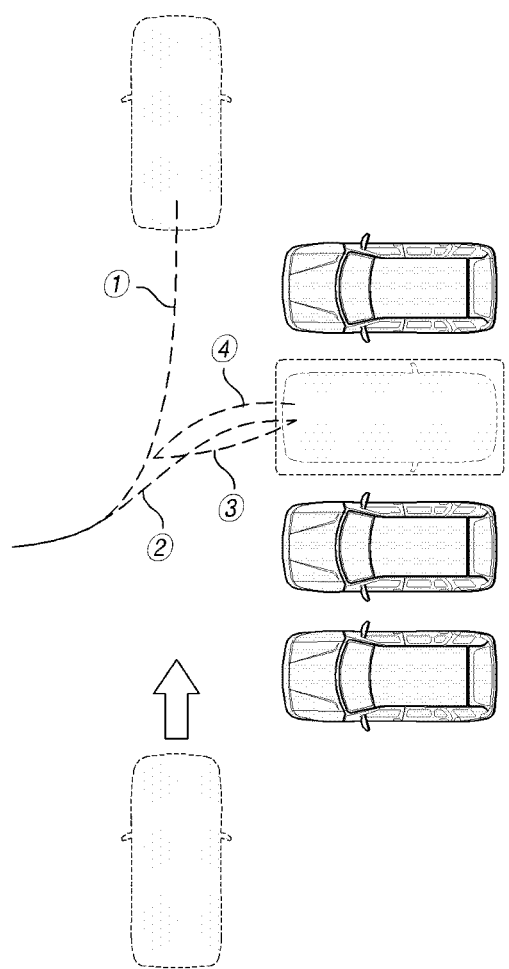
FIG. 6 is an exemplary diagram illustrating a parking path of a right head-in perpendicular parking mode.

For example, in cases where a right perpendicular parking mode is selected in the selection of the first stage parking mode and a head-in parking mode is selected in the second stage, the path setting unit 25 may set, as illustrated in FIG. 6, a parking path having four steps in which the vehicle moves backward while passing a parking space, moves forward to the parking space, moves backward to the outsie of the parking space, and moves forward into the parking space.

Figure 7:
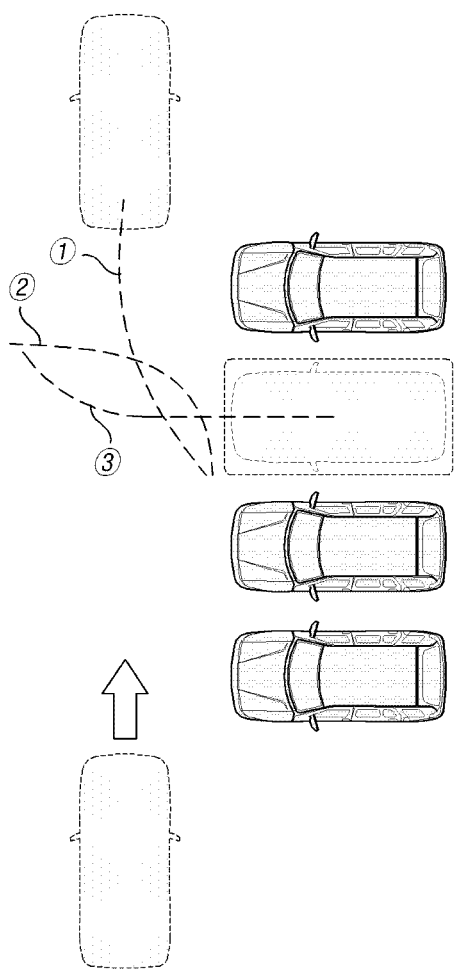
FIG. 7 is an exemplary diagram illustrating a parking path of a right reverse perpendicular parking mode.

In another example, in cases where a right perpendicular parking mode is selected in the selection of the first stage parking mode and a reverse parking mode is selected in the second stage, the path setting unit 25 may set, as illustrated in FIG. 7, a parking path having three steps in which the vehicle moves backward near a parking space, moves forward to the outside of the parking space, and moves backward into the parking space.

The parking controller 30 performs the overall control for parking the vehicle. When the driver selects the first stage parking mode through the parking mode selection unit 10, the parking controller 30 provides the information detected by the side sensors to the parking space search unit 20 while driving the vehicle forward.

When the parking space search unit 20 identifies a parking space and determines that parking is possible, the parking controller 30 displays the screen of FIG. 4 through the display panel or the HMI to allow the driver to input the selection of the second stage parking mode in cases where a right perpendicular parking mode or a left perpendicular parking mode is selected in the selection of the first stage parking mode. When the driver selects a head-in parking mode or a reverse parking mode, the parking controller 30 operates the path setting unit 25 to set a parking path relevant to the corresponding parking mode.

In cases where a right parallel parking mode or a left parallel parking mode is selected in the selection of the first stage parking mode, the parking controller 30 operates the path setting unit 25 to set a parking path relevant to the corresponding parking mode when a parking space is completely discovered and it is determined that parking is possible.

When the parking path is completely set, the parking controller 30 controls the vehicle to move along the parking path, and in cases where a gear shifting operation is required during a parking control, the parking controller 30 informs the driver of the gear shifting operation through the speaker.

Figure 8:
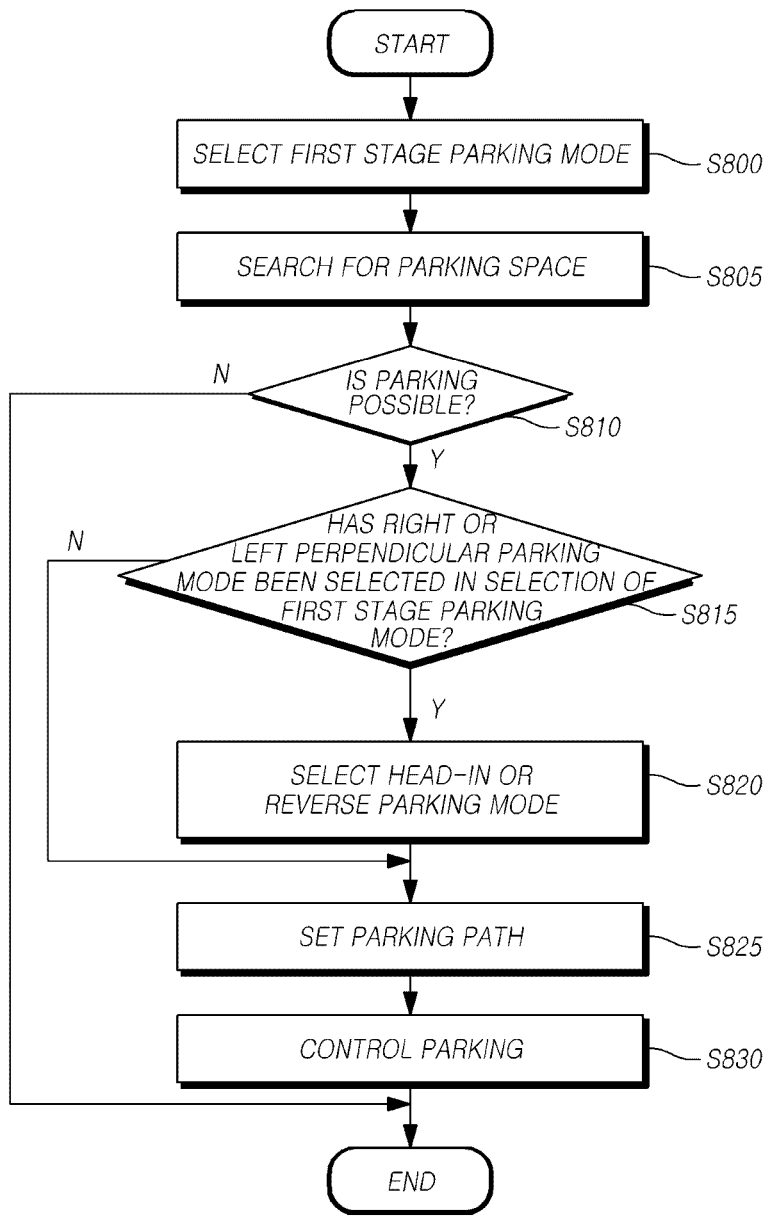
FIG. 8 is a flowchart illustrating a process in which a parking mode is selected and a parking control is performed by the parking control system according to the embodiment of the present invention.

A process in which the parking control system 1 selects a parking mode and performs a parking control, according to an embodiment of the present invention, will be described below with reference to FIG. 8.

A right perpendicular parking mode, a left perpendicular parking mode, a right parallel parking mode, and a left parallel parking mode, which are the first stage parking modes, are sequentially displayed on the HMI or the display panel when a driver selects the parking mode selection unit 10 in order to use the parking control system 1.

When the driver selects one of the first stage parking modes (S800), the parking controller 30 operates the parking space search unit 20 and the sensor unit 15, and autonomously drives the vehicle to search for a parking space (S805). The parking space search unit 20 receives information detected by the sensor unit 15 to search for a parking space during the autonomous driving of the vehicle, in which the parking space search unit 20 receives detected information from the side sensor disposed on the right side of the vehicle in cases where the right perpendicular parking mode or the right parallel parking mode is selected in the selection of the first stage parking mode, and receives detected information from the side sensor disposed on the left side of the vehicle in cases where the left perpendicular parking mode or the left parallel parking mode is selected in the selection of the first stage parking mode.

When it is determined that the parking space has been discovered according to the information provided from the side sensor, the parking space search unit 20 calculates the width and depth of the parking space. Thereafter, the parking space search unit 20 determines whether parking is possible, using the calculated width and depth of the parking space (S810). In this case, the parking space search unit 20 determines whether parking is possible, by comparing the calculated width and depth of the parking space according to whether the perpendicular parking mode or the parallel parking mode has been selected in the selection of the first stage parking mode.

When the parking space search unit 20 determines that parking is possible, the parking controller 30 determines whether to select the second stage parking mode according to whether the perpendicular parking mode or the parallel parking mode has been selected in the first stage.

When it is determined that the right perpendicular parking mode or the left perpendicular parking mode has been selected in the first stage (S815-Y), the parking controller 30 leads the driver to select either a head-in parking mode or a reverse parking mode, through the HMI, the display panel, and/or the speaker.

When the driver selects the head-in parking mode or the reverse parking mode as the second stage parking mode (S820), the parking controller 30 operates the path setting unit 25 to set a parking path relevant to the selected parking mode (S825).

In contrast, in cases where the right parallel parking mode or the left parallel parking mode has been selected in the first stage, the selection of the second stage parking mode is unnecessary, and therefore the parking controller 30 operates the path setting unit 25 to set a parking path corresponding to the parallel parking mode when the parking space search unit 20 determines that parking is possible (S825).

When the parking path has been completely set, the parking controller 30 performs a parking control while autonomously driving the vehicle according to the parking path (S830). In this case, if a gear shifting operation is required, the parking controller 30 requests the driver to shift the gear, through the speaker. When the vehicle enters the parking space and is completely parked, the parking controller 30 informs the driver that the vehicle has been completely parked.

As described above, according to the parking control system 1 in the first embodiment of the present invention, the selection of a parking mode is performed in two stages; in the first stage, one of the right and left perpendicular parking modes and the right and left parallel parking modes is selected, and in the second stage, either the head-in parking mode or the reverse parking mode is selected only when the right or left perpendicular parking mode is selected in the first stage.

Accordingly, one of four modes is selected in the first stage, so the number of times that the driver has to press the parking mode selection unit 10 is reduced, compared to the related art in which one of six existing modes is selected. Therefore, in cases where the driver misses a desired parking mode while pressing the parking mode selection unit 10, the number of times that the driver has to press the parking mode selection unit 10 again is relatively reduced.

In addition, in cases where a parallel parking mode is selected in the first stage, the selection of the parallel parking mode is completed only by pressing the parking mode selection unit 10 three or four times. Therefore, the number of times that the driver presses the parking mode selection unit 10 in order to select the parallel parking mode is reduced by 2, compared to the related art, so that the driver can more rapidly select the parallel parking mode in an easy and convenient manner.

As the number of times that the driver has to press the parking mode selection unit 10 decreases in this way, the possibility of a breakdown of the buttons constituting the parking mode selection unit 10 can be reduced.

The embodiment has been described above in which the parking space search unit 20 searches for a parking space after the mode selection in the first stage is completed.

On the other hand, a parking mode may be selected after a parking space is discovered by the parking space search unit 20. Such an embodiment will hereinafter be described with reference to FIGS. 9 and 10.

Figure 9:
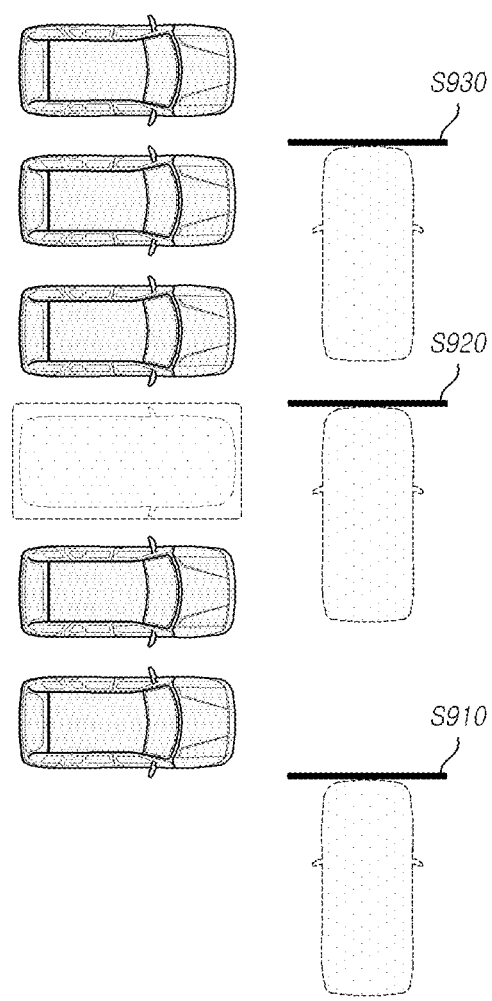
FIG. 9 is an exemplary diagram illustrating a process in which a vehicle is parked according to another embodiment of the present invention.
Figure 10:
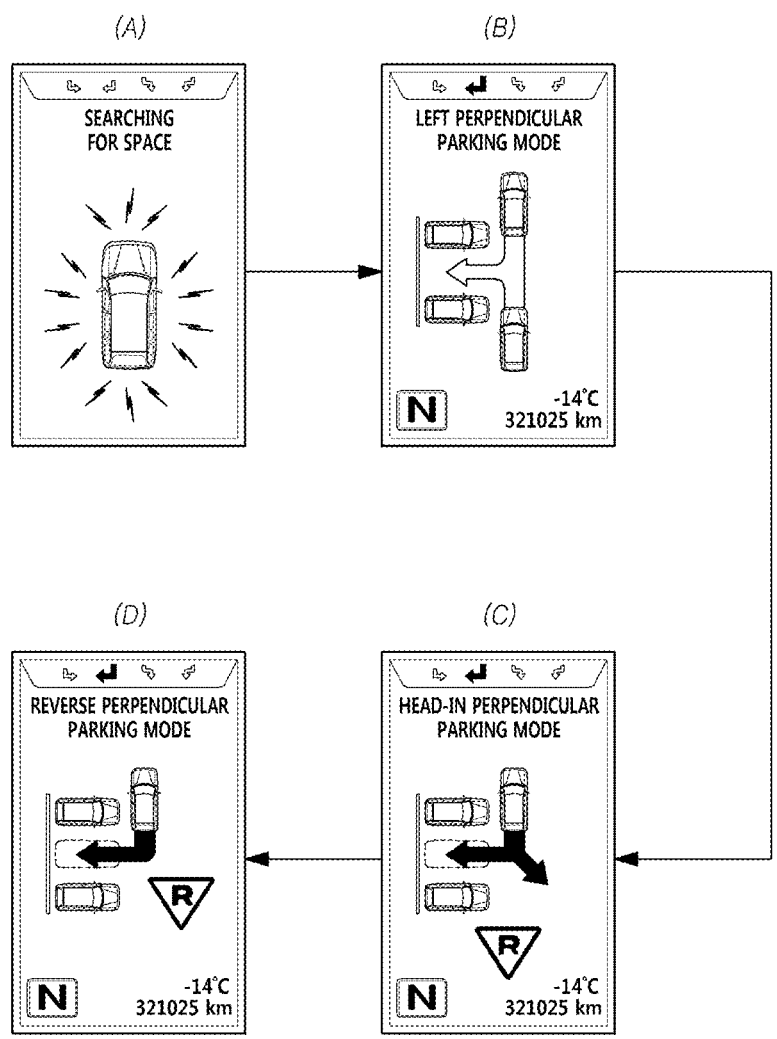
FIG. 10 illustrates screens displayed on a display device in the parking process of FIG. 9.

FIG. 9 is an exemplary diagram illustrating a process in which a vehicle is parked according to another embodiment of the present invention, and FIG. 10 illustrates screens displayed on a display device in the parking process of FIG. 9.

The parking space search unit 20 may search for a parking space when the speed of the vehicle is reduced to a predetermined speed or lower. For example, when the travel speed is reduced to a predetermined value or lower as the vehicle enters a parking lot, the parking space search unit 20 may start to search for a parking space (in step S910 of FIG. 9).

At this time, a screen representing that the parking space search unit 20 is searching for a parking space may be displayed, as illustrated in FIG. 10 (a), on a display device (e.g., an HMI or a display panel) included in the vehicle.

Meanwhile, since the parking space search unit 20 searches for a parking space while a parking mode is not selected, the parking space search unit 20 searches for both parallel parking mode and a perpendicular parking mode. For example, the parking space search unit 20 determines whether detected values of the sensor unit 15 satisfy both a parallel parking space and a perpendicular parking space. More specifically, the parking space search unit 20 identifies a parking space using detected values from the side sensors of the vehicle. In this case, the parking space search unit 20 determines whether the width and depth of the identified parking space corresponds to a parallel parking space or a perpendicular parking space.

In another aspect, the parking space search unit 20 may determine a parking mode in which the vehicle can be parked in the discovered parking space. For example, the parking space search unit 20 may search for a parking space using the values detected by the sensor unit 15 and may determine a parking mode in which the vehicle can be parked in such a parking space.

When the parking space search unit 20 discovers a parking space through such a process (in step S920 of FIG. 9), the discovered parking space may be displayed on the display device.

The parking mode corresponding to the discovered parking space is displayed in FIG. 10 (b). The parking mode determined by the parking space search unit 20 may be displayed on the display device as illustrated in FIG. 10 (b).

Meanwhile, selectable parking modes may be sequentially displayed on the display device as described above with reference to FIG. 3. However, when the parking space search unit 20 determines the parking mode in which the vehicle can be parked in the discovered parking space as described above, the parking mode determined by the parking space search unit 20 may be displayed on the display device irrespective of the sequence in which the selectable parking modes are displayed.

For example, in cases where the display sequence of the selectable parking modes has been determined as illustrated in FIG. 3 (in the sequence of a right perpendicular parking mode, a left perpendicular parking mode, a right parallel parking mode, and a left parallel parking mode), the right perpendicular parking mode may be first displayed on the selection screen in the first stage. However, the left perpendicular parking mode is first displayed as illustrated in FIG. 10 (b) in the above embodiment.

In this case, a driver or a user may sequentially change the displayed parking modes by manipulating a selection button. For example, although the left perpendicular parking mode is first displayed in the example of FIG. 10 (b), the user may manipulate the selection button to make the next parking mode (the right parallel parking mode in FIG. 3) to be displayed. In other words, although the parking mode determined by the parking space search unit 20 is first displayed, the following display sequence may comply with a predetermined sequence.

In cases where the parking mode, which is determined by the parking space search unit 20, is first displayed in this way, the driver or the user can select the first stage parking mode desired thereby through just one selection without changing the display of the selectable parking modes.

Meanwhile, when the selection of the first stage parking mode in the perpendicular parking mode is completed, a second stage selection screen for selecting a head-in parking mode or a reverse parking mode may be displayed on the display device.

The second stage selection screen may also be displayed in the predetermined sequence. The embodiment in which the head-in parking mode and the reverse parking mode are displayed on one screen and one of them is selected has been described above with reference to FIG. 4. However, selection screens for the head-in parking mode and the reverse parking mode may be individually displayed. For example, the selection screen for the head-in parking mode may be displayed first, and the selection screen for the reverse parking mode may be displayed next.

Referring to FIG. 10 (c), the selection screen for the head-in parking mode is displayed first as a second stage selection screen. In this case, the driver or the user may change the display screen to the selection screen for the reverse parking mode by manipulating the selection button and may select the corresponding parking mode.

After the parking space is discovered, the vehicle may further travel in order to move to the position where parking control is possible or to search for another parking space.

When the vehicle moves to the position where the parking control is possible (S930 of FIG. 9), a screen representing that the parking control is possible may be displayed on the display device as illustrated in FIG. 10 (d).

Figure 11:
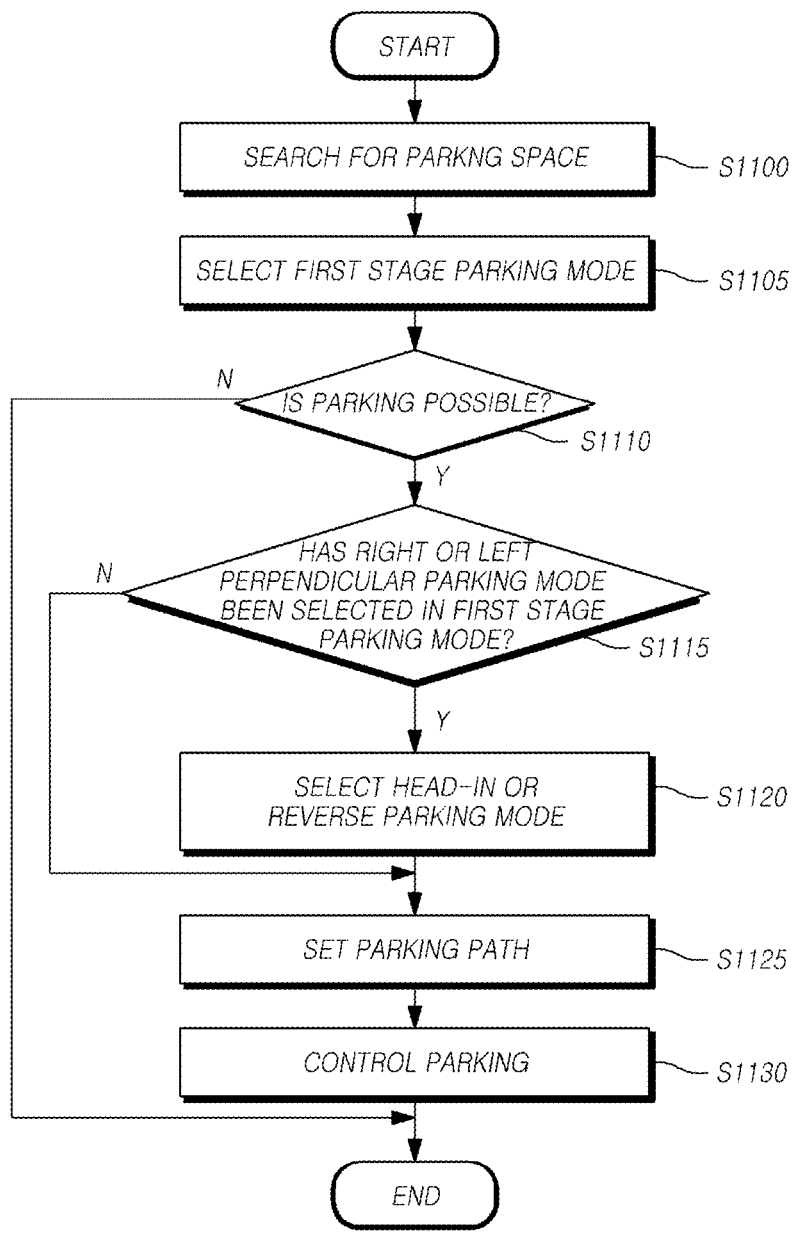
FIG. 11 is a flowchart illustrating a process in which a parking mode is selected and a parking control is performed by a parking control system according to another embodiment of the present invention.

FIG. 11 is a flowchart illustrating a process in which a parking mode is selected and a parking control is performed by a parking control system according to another embodiment of the present invention.

Referring to FIG. 11, when the speed of a vehicle is reduced to a predetermined speed or lower, a parking space search unit 20 may start to search for a parking space (S1100). At this time, the vehicle may be driven by a driver or autonomously.

The parking space search unit 20 searches for both a perpendicular parking space and a parallel parking space. Further, the parking space search unit 20 may search for both a left parking space and a right parking space. The parking space search unit 20 may search for the left parking space using detected information from a left-side sensor and the right parking space using detected information from a right-side sensor.

When a parking space is discovered, the parking space search unit 20 may determine a parking mode in which the vehicle can be parked in the corresponding parking space. For example, the parking space search unit 20 may determine the parking mode in which the vehicle can be parked in the corresponding parking space, based on the width, depth, and direction of the parking space.

After the parking space is discovered, selectable parking modes may be sequentially displayed by a parking mode selection unit 10.

In this case, the display sequence of the parking modes may be determined in advance. However, the parking mode first displayed according to the corresponding display sequence may be a parking mode in which the parking space search unit 20 determines that the vehicle can be parked in the corresponding parking space.

For example, a right perpendicular parking mode, a left perpendicular parking mode, a right parallel parking mode, and a left parallel parking mode may be sequentially displayed on a display device in the first stage. However, in cases where the parking mode determined by the parking space search unit 20 is a left perpendicular parking mode, the parking modes may be displayed on the display device in the sequence of the left perpendicular parking mode, the right parallel parking mode, the left parallel parking mode, and the right perpendicular parking mode.

When the driver selects one of the first stage parking modes (S1105), the parking space search unit 20 determines whether the vehicle can be parked in the discovered parking space in the selected parking mode (S110). The parking space search unit 20 calculates the width and depth of the parking space and determines whether the vehicle can be parked in the corresponding parking space, using the calculated width and depth of the parking space. In this case, the parking space search unit 20 may determine whether the vehicle can be parked by comparing the calculated width and depth of the parking space according to whether the perpendicular parking mode or the parallel parking mode has been selected in the selection of the first stage parking mode.

When the parking space search unit 20 determines that the vehicle can be parked (S1110-Y), a parking controller 30 determines whether to select the second stage parking mode according to whether the perpendicular parking mode or the parallel parking mode has been selected in the first stage (S1115).

When the right perpendicular parking mode or the left perpendicular parking mode has been selected in the first stage (S1115-Y), the parking controller 30 leads the driver to select either a head-in parking mode or a reverse parking mode, through an HMI, a display panel, and/or a speaker.

When the driver selects the head-in parking mode or the reverse parking mode as the second stage parking mode (S1120), the parking controller 30 operates a path setting unit 25 to set a parking path relevant to the selected parking mode (S1125).

In contrast, in cases where the right parallel parking mode or the left parallel parking mode has been selected in the first stage, the selection of the second stage parking mode is unnecessary, and therefore the parking controller 30 operates the path setting unit 25 to set a parking path corresponding to the parallel parking mode when the parking space search unit 20 determines that the vehicle can be parked (S1125).

When the parking path has been completely set, the parking controller 30 performs a parking control while autonomously driving the vehicle according to the parking path (S1130). In this case, if a gear shifting operation is required, the parking controller 30 requests, through the speaker, the driver to shift the gear. When the vehicle enters the parking space and is completely parked, the parking controller 30 informs the driver that the vehicle has been completely parked.

Although the embodiment has been described above in which the parking modes are sequentially displayed, the parking modes in each stage may be simultaneously displayed on one screen of the display device.

Figure 12:
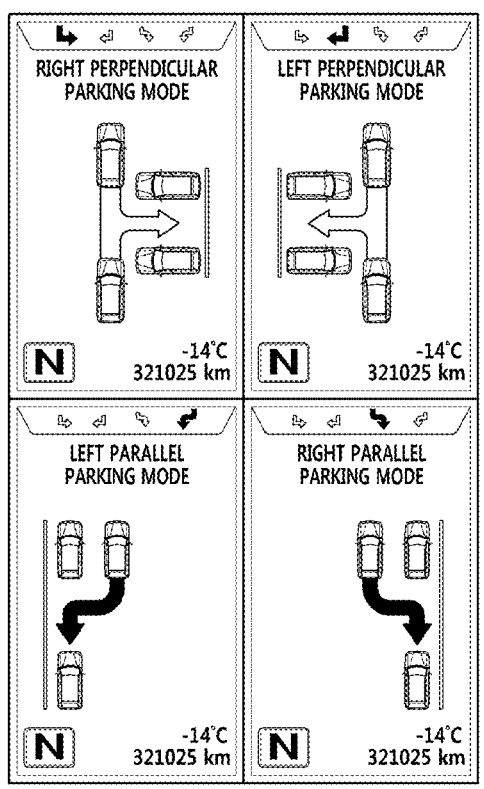
FIG. 12 illustrates screens displayed on a display device of a vehicle, according to yet another embodiment of the present invention.

FIG. 12 illustrates screens displayed on a display device of a vehicle, according to yet another embodiment of the present invention.

Referring to FIG. 12, four first-stage parking modes sequentially displayed in the embodiment of FIG. 3 are simultaneously displayed on a single screen. When a selection is completed in the first stage, second stage parking modes may be simultaneously displayed on a single screen of a display device like the screen illustrated in FIG. 4.

A parking mode selection unit 10 may support the first stage selection and the second stage selection such that a parking mode is selected according to a user control input (e.g., a touch control input) on the display device.

Although the embodiments of the present invention have been described for illustrative purposes, those skilled in the art will appreciate that various modifications, additions and substitutions are possible, without departing from the scope and spirit of the invention. Therefore, exemplary aspects of the present disclosure have not been described for limiting purposes. The scope of the present invention shall be construed on the basis of the accompanying claims in such a manner that all of the technical ideas included within the scope equivalent to the claims belong to the present invention.

What is claimed is:

1. A parking control system comprising:
    a parking mode selection unit that supports a first-stage selection and a second-stage selection, wherein one of a right perpendicular parking mode, a left perpendicular parking mode, a right parallel parking mode, and a left parallel parking mode is selectable in the first-stage selection, and a head-in parking mode or a reverse parking mode is selectable in the second-stage selection in cases where the right perpendicular parking mode or the left perpendicular parking mode is selected in the first-stage selection;
    a sensor unit comprising a plurality of sensors mounted on one or more of the front, rear, and sides of a vehicle;
    a parking space search unit that searches for a parking space based on a value detected by the sensor unit;
    a path setting unit that sets a parking path along which the vehicle is parked in the parking space, which is discovered by the parking space search unit, according to the parking mode selected by the parking mode selection unit; and
    a parking controller that controls the vehicle to move along the parking path set by the path setting unit,
    wherein the parking space search unit searches for the parking space when the speed of the vehicle is reduced to a predetermined speed or lower.

2. The parking control system of claim 1, wherein the parking controller operates the parking space search unit to search for the parking space and then controls the parking mode selection unit to perform the second-stage selection in cases where either the right perpendicular parking mode or the left perpendicular parking mode is selected in the first-stage selection.

3. The parking control system of claim 1, wherein the parking controller operates the parking space search unit to search for the parking space and then operates the path setting unit to set the parking path in cases where either the right parallel parking mode or the left parallel parking mode is selected in the first-stage selection.

4. The parking control system of claim 1, wherein the parking space search unit determines a parking mode in which the vehicle is able to be parked in the discovered parking space.

5. The parking control system of claim 4, further comprising:
    a display device on which parking modes of each stage are sequentially displayed according to a user's control input.

6. The parking control system of claim 5, wherein the parking mode selection unit displays the parking mode determined by the parking space search unit on the display device, as a first-stage selection screen.

7. The parking control system of claim 5, wherein the parking mode determined by the parking space search unit is displayed on the display device.

8. The parking control system of claim 5, wherein a screen representing that a parking control is possible is displayed on the display device when the vehicle is at a controllable position after the parking space is discovered by the parking space search unit and the parking mode is selected by the parking mode selection unit.

9. The parking control system of claim 1, further comprising:
    a display device on which parking modes of each stage are simultaneously displayed on a single screen,
    wherein the parking mode selection unit supports the first-stage selection and the second-stage selection such that a parking mode is selected according to a user's control input on the display device.

10. The parking control system of claim 1, wherein the parking space search unit selects one or more selectable parking modes, in which the vehicle is able to be parked in the parking space discovered by the parking space search unit, among the right perpendicular parking mode, the left perpendicular parking mode, the right parallel parking mode, and the left parallel parking mode.

11. The parking control system of claim 10, further comprising a display device displaying the first-stage selection or the second-stage selection,
    wherein an order of displaying the first-stage selection is the one or more selectable parking modes selected by the parking space search unit first, and one or more parking modes unselected by the parking space search unit later.

12. A parking control method comprising:
providing a first-state selection in which one of a right perpendicular parking mode, a left perpendicular parking mode, a right parallel parking mode, and a left parallel parking mode is selectable;
when the right perpendicular parking mode or the left perpendicular parking mode providing is selected in the first-stage selection, providing a second-stage selection in which a head-in parking mode or a reverse parking mode is selectable;
searching a parking space;
creating a parking path for the discovered parking space according to the head-in parking mode or the reverse parking mode which is selected in the second-stage parking mode selection step; and
controlling the parking of a vehicle according to the created parking path,
wherein the searching the parking space comprises searching for the parking space when the speed of the vehicle is reduced to a predetermined speed or lower.

13. The parking control method of claim 12, wherein the searching the parking space comprises determining a parking mode in which the vehicle is able to be parked in the discovered parking space, and the providing the first-stage selection comprises displaying the parking mode determined in the searching the parking space as a first-stage selection screen.

14. The parking control method of claim 12, wherein the searching the parking space comprises selecting one or more selectable parking modes, in which the vehicle is able to be parked in the parking space discovered by a parking space search unit, among the right perpendicular parking mode, the left perpendicular parking mode, the right parallel parking mode, and the left parallel parking mode.

15. The parking control method of claim 14, further comprising displaying the first-stage selection or the second-stage selection.

16. The parking control method of claim 12, further comprising determining, by a parking space search unit, a parking mode in which the vehicle is able to be parked in the searched parking space.

17. The parking control method of claim 12, further comprising simultaneously displaying parking modes of each stage on a single screen.

* * * * *